(12) United States Patent
Smith

(10) Patent No.: US 10,036,164 B2
(45) Date of Patent: Jul. 31, 2018

(54) MATRIX BASALT REINFORCEMENT MEMBERS FOR CONCRETE

(75) Inventor: Donald R. Smith, Pompano, FL (US)

(73) Assignee: Raw Energy Tech, LLC, Pompano Beach, FL (US)

(*) Notice: Subject to any disclaimer, the term of this patent is extended or adjusted under 35 U.S.C. 154(b) by 0 days.

(21) Appl. No.: 13/436,653

(22) Filed: Mar. 30, 2012

(65) Prior Publication Data
US 2012/0298291 A1 Nov. 29, 2012

Related U.S. Application Data

(60) Provisional application No. 61/470,910, filed on Apr. 1, 2011.

(51) Int. Cl.
| | |
|---|---|
| *E04C 5/07* | (2006.01) |
| *C04B 14/46* | (2006.01) |
| *E01C 11/18* | (2006.01) |

(52) U.S. Cl.
CPC .......... *E04C 5/07* (2013.01); *C04B 14/4668* (2013.01); *E01C 11/18* (2013.01)

(58) Field of Classification Search
CPC ........................................ E04C 5/07
USPC .......................... 156/169, 172, 173, 175, 71
See application file for complete search history.

(56) References Cited

U.S. PATENT DOCUMENTS

| | | | | |
|---|---|---|---|---|
| 4,137,354 A | * | 1/1979 | Mayes et al. | 156/175 |
| 5,846,364 A | * | 12/1998 | Policelli | 156/169 |
| 2005/0115186 A1 | * | 6/2005 | Jensen | A45F 3/04 52/633 |
| 2006/0277837 A1 | | 12/2006 | Wilsey | |
| 2010/0308147 A1 | * | 12/2010 | Brandstrom | 156/172 |
| 2011/0064517 A1 | * | 3/2011 | Sader | 404/28 |

FOREIGN PATENT DOCUMENTS

| | | | |
|---|---|---|---|
| CA | 2630878 | | 11/2009 |
| SU | 1609699 A | * | 11/1990 |
| WO | WO2010048688 | | 5/2010 |

OTHER PUBLICATIONS

Presley, Marina, "Basalt Fiber Rebar", Mar. 3, 2011, from the webpage http://www.monolithic.com/stories/basalt-fiber-rebar.*
Thermalguard Technology llc, reinfring Bar (rebar or armature), Thermalguard Technology C-Bar, 2010, pp. 1-6.*

* cited by examiner

*Primary Examiner* — Jeffry H Aftergut
(74) *Attorney, Agent, or Firm* — McHale & Slavin, P.A.

(57) ABSTRACT

Matrix basalt reinforcing members for concrete. The basalt members are specifically formed to provide tension support having a beneficial use with pervious concrete used in large areas such as sidewalk and parking lot. The basalt reinforcing members add structural rigidity to the pervious concrete, making the pervious concrete capable of supporting heavy loads such as trucks without cracking while allowing water to pass through the concrete. The basalt reinforcing members are formed from roving crosses and interlaces in between each side of the figure 8 shape to mitigate potential for sheer at crossovers.

12 Claims, 18 Drawing Sheets

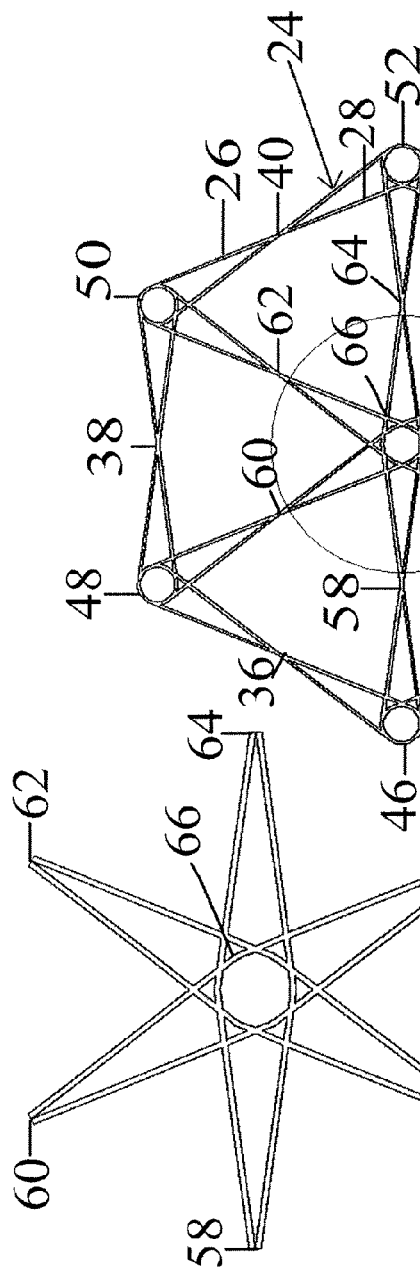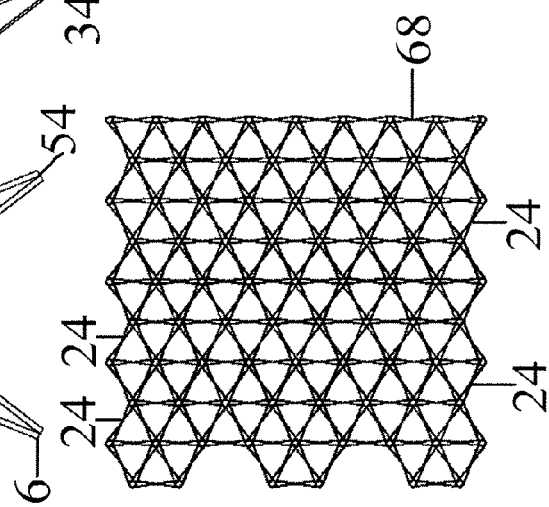
FIG. 3 D
FIG. 3 E
FIG. 3 C

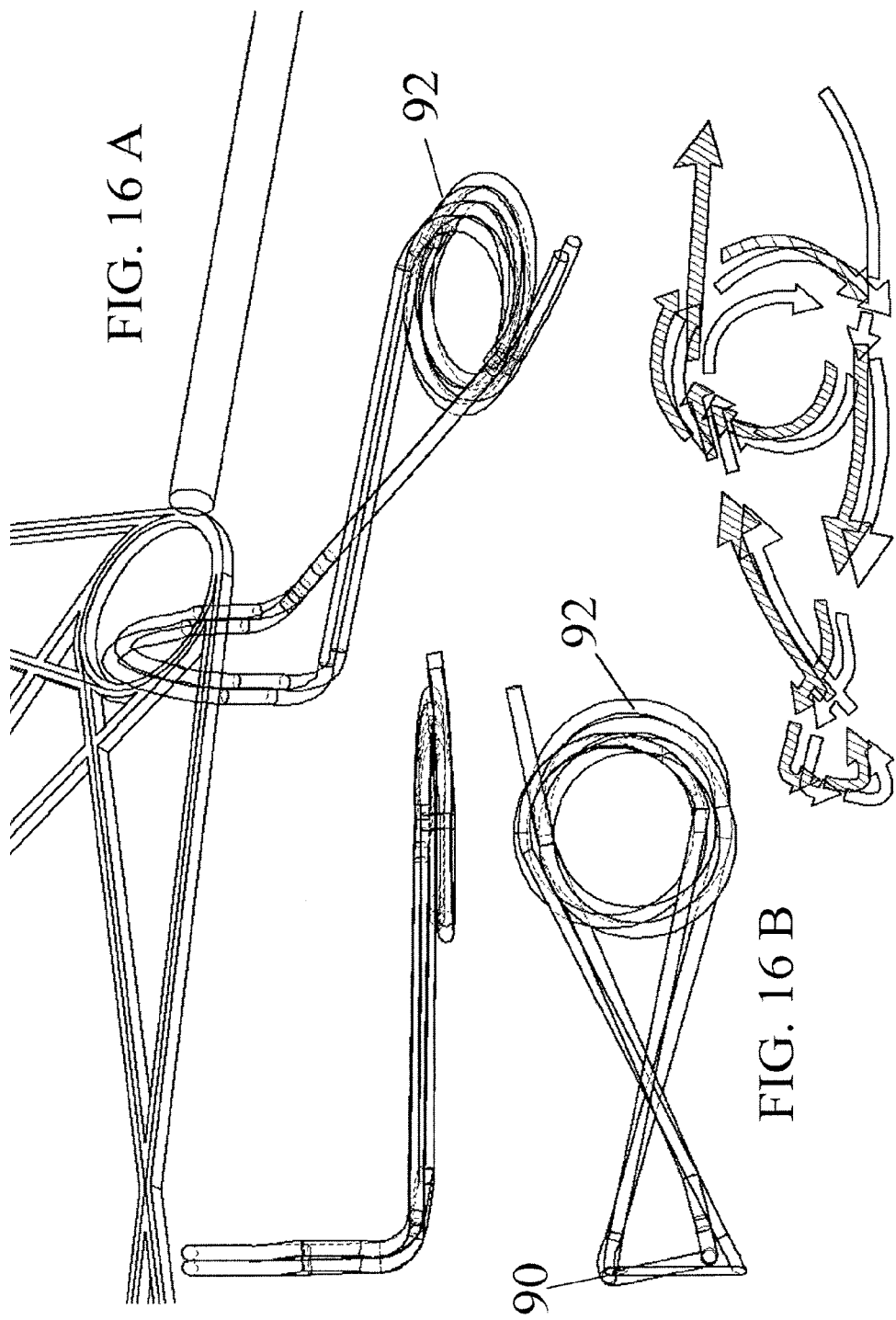

MATRIX BASALT REINFORCEMENT MEMBERS FOR CONCRETE

RELATED APPLICATIONS

This application claims the benefit of priority under 35 U.S.C. 119(e) of U.S. Provisional Patent Application No. 61/470,910, filed Apr. 1, 2011, entitled MATRIX BASALT REINFORCEMENT MEMBERS FOR PERVIOUS CEMENT, the entirety of which is incorporated herein by reference.

FIELD OF THE INVENTION

This invention relates broadly to concrete reinforcement, and more particularly, to reinforcement members made from continuous basalt fiber in a configuration to improve tensioning in pervious concrete and reinforced masonry structures.

BACKGROUND OF THE INVENTION

Concrete is very strong in compression, but relatively weak in tension. To compensate for this imbalance in concrete's behavior, reinforcement bars (rebar) are cast into the concrete to carry the tensile structural load. With the advent of pervious concrete, which is cement and aggregate foundation that allows water to pass, the need for a reinforcement bar that can carry the tensile structural load without reinforcement slip within the concrete or degradation is critical. Especially since the concrete may accept sea water or the snowmelt having dissolved road salt therein. The pervious concrete has been found to be most beneficial in areas that otherwise experienced flooding.

Pervious concrete pavement is known for its environmental friendly aspects, namely a way of capturing rain water and allowing the water to seep into the ground. The pervious concrete reduces storm water runoff and meets the U.S. Environmental Protection Agency (EPA) storm water regulations. The pervious concrete has a unique application by eliminating the need for retention ponds, swales, and other storm water management devices. The economic implications of allowing higher building density while meeting code compliance with regards to water retention are significant.

Pervious concrete is formed from cementious materials used to create a paste that forms a thick coating around aggregate particles. Pervious concrete contains little or no sand, creating a substantial void content. Using sufficient paste to coat and bind the aggregate particles together creates a system of highly permeable, interconnected voids that drains quickly. Typically, between 15% and 25% voids are achieved in the hardened concrete, and flow rates for water through pervious concrete are typically around 480 in./hr (0.34 cm/s, which is 5 gal/ft$^2$/min or 200 L/m$^2$/min), although they can be much higher. Both the low mortar content and high porosity also reduce strength compared to conventional concrete mixtures.

While pervious concrete can be used for numerous applications, its most beneficial use is in pavement that allows automobile and truck travel. Similar to non-pervious concrete, reinforcement is required in the pervious concrete to carry the tension forces. Despite steel being slightly higher thermal expansion as compared to Portland cements. Steel reinforcement bars, mesh and staples have been commonly used as the tensile reinforcement for concrete. However experience over time has shown that when steel reinforced concrete freezes or gets hot, the two materials contract and expand differently thereby assisting in the opening or micro cracks and subsequent water intrusion. Steel typically includes surface deformations to further improve that bond. Due to the strong bond, the concrete effectively transfers stresses to the steel and vice versa. Additionally, with regards to more stand density of concrete it has become popular to use short lengths of various, organic or non-organic plastic, or metal, as staples with the concrete matrix rather than reinforcement bars or mesh.

Unfortunately, while the initial bond between reinforcing steel bars and concrete is strong, the steel can deteriorate within the concrete. While cement paste helps to form a non-reactive surface film to inhibit corrosion, this passivation process is not effective if the steel is exposed to the elements. Use of steel reinforcement bars in pervious concrete immediately exposes the steel to the elements and corrosion is expected immediately. Further, the porosity of pervious concrete requires additional steel reinforcement to handle the same loads as non-pervious concrete and/or thicker layers of concrete. With regards to the recent use of various short lengths of materials as staples to reinforce pervious it is impractical as the high number of voids within the pervious is not conducive to a good mechanical strength. Rather it is subject to the ultimate interfacial peel and or sheer strength of the cement between the staple and the aggregate in the pervious concrete.

Other non-metal reinforcement bar is known in the art, including the use of fiberglass, aramid fibers such as Kevlar, Tarwon, and carbon fiber. However, fiberglass is porous and it is known to be attacked by the relatively high alkalinity levels common within Portland cements. In addition, as compared to the natural elasticity of Portland based concretes fiberglass and aramids exhibit excessive stretch to operate as perfect tensile members within the matrix. As a result the concrete may exhibit micro cracking before fiberglass and aramid reinforcements can fully "load up". To offset these characteristics engineers must design in more of these FRP materials to prevent excessive panel or beam deflection as compared to traditional steels or carbon fiber reinforcements. Carbon fiber reinforcements however exhibit extremely short stretch and elongation to break. As a result an engineer must insure the use of enough CFRP to carry all the tensile loading of the matrix. These factors coupled with the high expense of carbon fiber make its use impractical.

More recently, reinforcement bar produced from continuous basalt fiber has been found to be superior to steel in both pervious and non-pervious concrete. The Applicant, Raw Energy Materials of Pompano Beach Fla., is a manufacture of several continuous basalt fiber reinforcements marked under the trade name RockRebar™, Rock Stirrups™, RockMesh™ and RockDNA™ that is now commonly placed within concrete, including water passing pervious concrete.

SUMMARY OF THE INVENTION

In light of the above and according to one aspect of the invention, disclosed herein is a basalt reinforcement bar matrix to form improved concrete structures that can be used to make roads, sidewalks and other pavements or infrastructures. Specifically, the present invention utilizes pervious concrete material with matrix basalt reinforcement members that address the unique properties of concrete, namely while a mix may be sufficiently high in compression strength most likely it will be inherently quite low in tensile strength. Most likely low in ultimate bond potential with any conventional reinforcement and open to subjecting any reinforcement introduce to high level of moisture intrusion which ultimately will introduce elevated levels of acids salts and alkalinity in addition to hydrocarbons present in water runoff. While pervious concrete is a preferred embodiment, other types of concrete and masonry products can also be employed with the present invention.

The extremely low stretch and cyclical tenacity of continuous basalt fiber is exploited to produce a reinforcing member specifically formed to provide tension support for pervious concrete. The reinforcing members produced using continuous basalt fibers (CBF) in an appropriate adhesive matrix be it a thermo plastic or a thermo set epoxy, vinyl ester or urethane add structural rigidity to the pervious concrete, making the pervious concrete capable of supporting heavy loads such as trucks without cracking while allowing water to pass through the concrete. The CBF reinforcing members are formed from multiple roving (bundles) to produce the required strength for the load predictions in a similar manner to steel calculations. The micron size of the basalt fiber and the size of the CBF roving may be altered as necessary. To prevent slippage of the reinforcement within the concrete the roving's are spaced sufficiently to allow the concrete to flow between the legs and crossed and interlaces in between each side of a figure 8 shape to mitigate potential for sheer at crossovers as in the case of the single figure 8 rebar. Or as in the case of the grid, the geometry contains so many legs surrounding the central intersection pins as to bond and bind into a monolithic hub that dissipates panel tension or compression laterally thus inherently reducing pressure concentration that could otherwise deflect the concrete street, wall or panel sufficiently to cause sheer of the continuous basalt fiber reinforcement at the overlap and or crossovers. In any case the manufacturing process of the reinforcement is continuous without cold secondary bonds of the continuous basalt fiber with the adhesive matrix.

The basalt reinforcing members are basalt rebar rods made of continuous basalt fiber strands combined with non-corrosive thermo set or thermo plastic polymer formed into a matrix shape that, when placed within pervious concrete, adds structural rigidity to the concrete wherein the concrete is capable of supporting loads as normally experienced on pavements. One benefit of using continuous basalt fiber is that in the event of a onetime catastrophic overload cracks the cementious material continuous basalt fiber reinforcement does not exhibit memory for the event and continuous basalt fiber reinforced concrete construction tends to return to their original condition and shape. As an example in the case of a street formed utilizing pervious concrete, the street can be inadvertently crushed by a heavy fire truck. There is a high probability the street would pop back and the void between the depressed underlayment and the underside of the pervious refilled by washing in fine sand.

Continuous basalt fiber is manufactured from basalt filaments made by melting crushed volcanic rock of a specific mineral mixture known as a breed and drawing the molten material into fibers. The fibers cool to form hexagonal chains resulting in a resilient structure having a substantially higher tensile strength than steel of the same diameter at one fifth the weight and virtually corrosion free.

An objective of the present invention is to provide a continuous basalt fiber material matrix configuration that is an economical and sustainable alternative to steel and fiberglass rebar, mesh, or staple for concrete reinforcement.

Another objective of the present invention is to provide concrete reinforcement with a matrix that cannot rust like steel and does not absorb or wick water into the concrete.

Still another objective of the present invention is to provide a basalt material for use in combination with porous water passing concrete used to increase water retention and reduce run off problems.

Still another objective of the present invention is to provide a continuous basalt fiber material configuration that is at least 2 times stronger than steel, yet lighter than steel rebar, thus making installation simpler and less stressful on the workers.

Yet still another objective of the present instant invention is to provide a basalt matrix configuration that allows for the reduction in the diameter of the rebar employed, when compared to steel rebar.

Yet still another objective of the present invention is to provide a basalt matrix reinforcement which is relatively light, compared to metal reinforcements, thus reducing shipping cost, logistics issues, and reducing lateral sheer within a concrete matrix induced by reinforcement displacement of the concrete in plane.

Yet another objective of the present invention is to provide a concrete reinforcement matrix that has the same thermal coefficient of expansion as concrete and is naturally resistant to corrosion, rust, alkali, and acids.

Still yet another objective of the present invention is to provide a concrete reinforcement matrix that does not conduct electricity and will not create a path for water to penetrate through the concrete.

Still yet another objective of the present invention is to provide a concrete reinforcement matrix that does not allow the creation of magnetic fields.

Still yet another objective of the present invention is to provide a concrete reinforcement matrix that does not absorb nuclear radiation.

Still yet another objective of the present invention is to eliminate radar reflection, the blockage of radio waves, microwaves, and thus permit improved thermo scans results.

Still yet another objective of the present invention is to provide reinforcement that provides a thermal break to mitigate HVAC costs improving energy efficiency.

Still yet another objective of the present invention is to provide a reinforcement design which acts to squeeze at the interface line with the concrete it reinforces a tension condition which aides in extending the onset of slip to beyond the point of where the concrete itself is crushed.

Still yet another objective of the present invention is to provide in a panel version of the present invention dispersing the load into the adjacent legs of the grids geometry in a fashion that spreads the load over a much larger foot print that possible with any single element reinforcement, thus reducing the thickness of the concrete required.

Yet another objective of the present invention is to extend the service limits of thermal load limits of a concrete structure.

Yet still another objective of the present invention is to enhance the cyclical tenacity of a concrete structure in a seismic event.

Yet still another objective of the present invention is to provide a concrete reinforcement matrix that can be cut with a conventional saw and/or with common tools found at construction sites and around a home.

Other objectives and further advantages and benefits associated with the basalt rebar matrix will be apparent to those skilled in the art from the description, examples and claims which follow.

BRIEF DESCRIPTION OF THE DRAWINGS

FIG. 16A is a detailed illustration of a spacer used for connecting adjoining panels;

FIG. 16B is a perspective view of two layers of basalt fiber matrix; and

FIG. 16C is a detail of basalt fiber used to connect two layers together.

DETAILED DESCRIPTION

Figure 1:
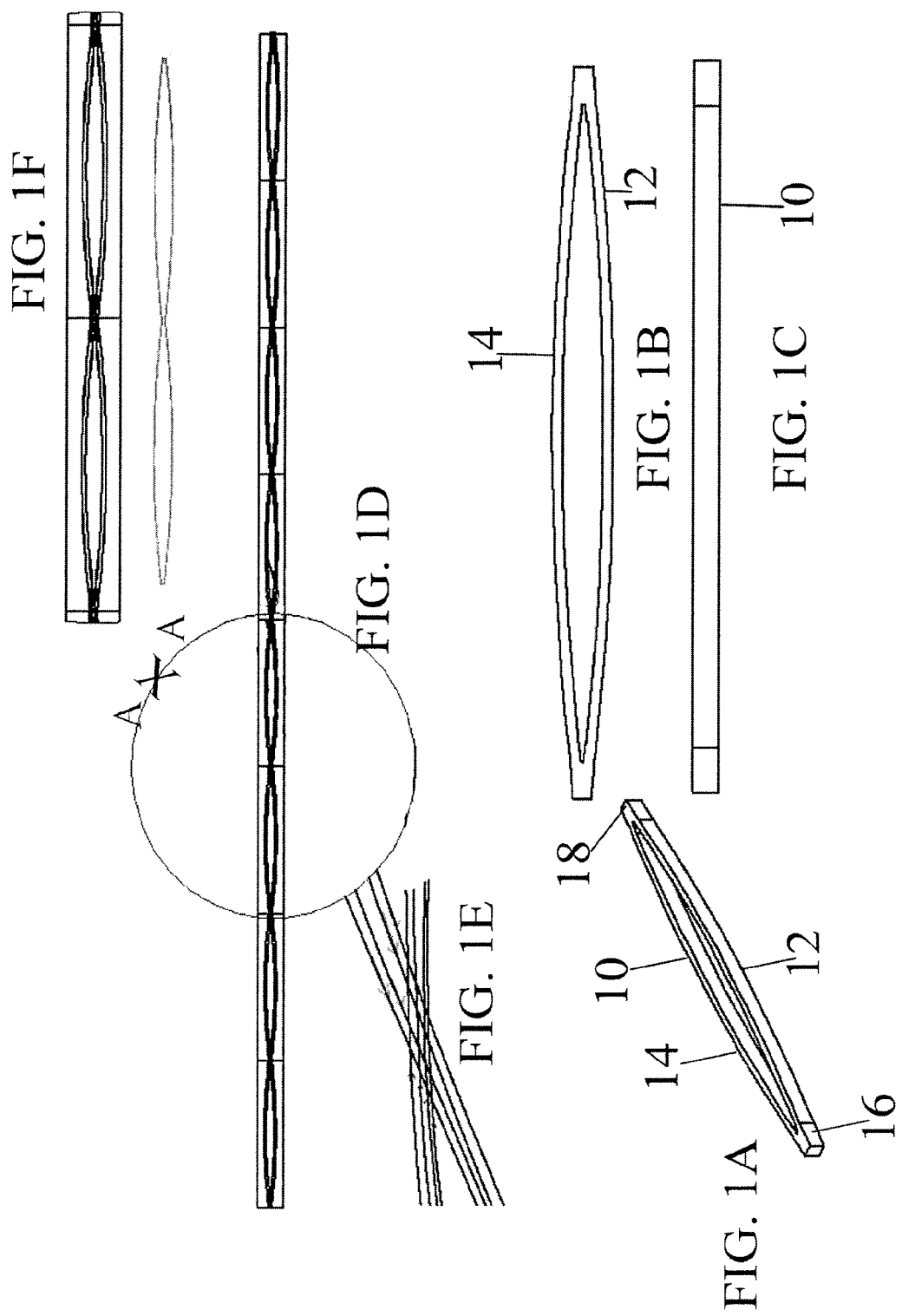
FIG. 1A is a perspective view of a basalt fiber roving cross.
FIG. 1B is a top view of FIG. 1A.
FIG. 1C is a side view of FIG. 1A.
FIG. 1D is a graphic illustration of the basalt fiber roving crosses.
FIG. 1E is an illustration of the basalt fiber roving crosses.
FIG. 1F is the detail taken within circle A-A in FIG. 1E.
Figure 2:
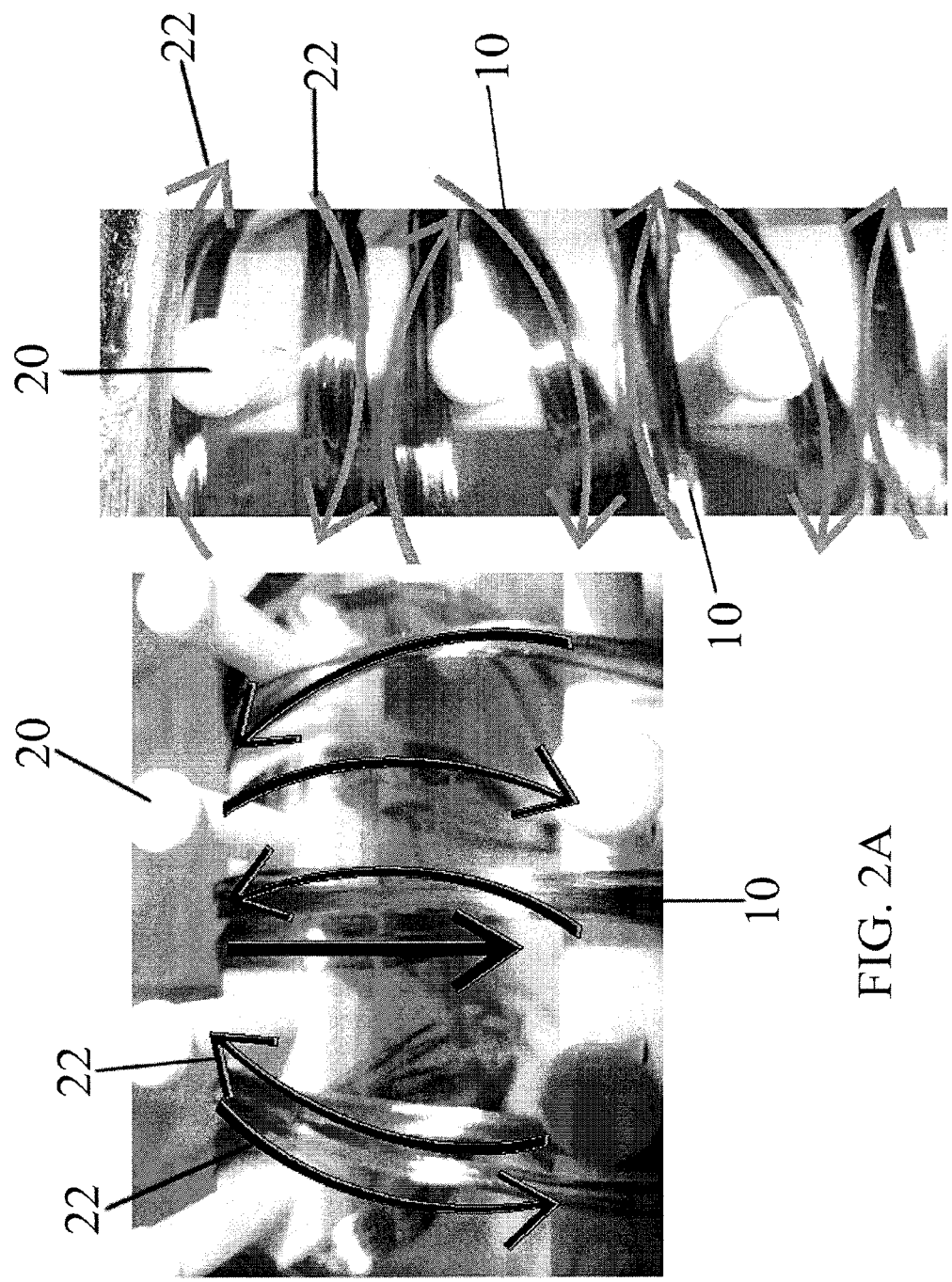
FIG. 2A is a view of basalt fibers being woven together.
FIG. 2B is another view of basalt fibers being woven together.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

FIGS. 1-16C, which are now referenced, illustrate the present invention and the manner in which it is manufactured.

Disclosed herein is an improved reinforcement matrix member for concrete structures or reinforced pavements. Specifically, the invention works with pervious concrete material wherein the basalt reinforcement members form structural support for concrete structures, pavements, roads, sidewalks and other infrastructure. Through the use of embodiments of the present invention, the concrete structure can be made stronger by adopting the high tensile, low stretch characteristics of continuous basalt fiber configures into a geometry that acts to tighten to the concrete it reinforces as load increases in a manner that extends the onset of bond slit to beyond the limits of the concrete matrix it reinforces resulting a somewhat self-healing structure where the lack of memory after a temporary overload will allow the structure to return to its original shape. Yet the matrix configuration will permit water to pass through the concrete without rusting thereby eliminating the need for complex storm water runoff systems in flood prone areas.

Basalt is a nontoxic naturally occurring volcanic rock that when processed into a continuous glassy fibers subsequently bundled into rovings that may be cold formed into straight or shaped reinforcement with a variety of benefits when compared to steel rebar typically used for reinforced concrete. Basalt is a naturally occurring rock which means it can resist rust or develop any type of corrosion and does not absorb any amount of water. Basalt rebar is also about ¼ of the weight of steel rebar, which makes basalt rebar much easier to transport and assemble on the job site. Also, basalt rebar can be easily cut using common tools in the field.

Basalt can outperform concrete 10:1 in compression strength and 100:1 in tension strength. The configuration of the instant invention is designed to address expansion and contraction as well as creep and fatigue. The result is a pervious concrete pavement that permits water and air to pass to provide various benefits such as reducing the need for complex and expensive storm water runoff systems in flood prone areas, yet eliminate the problems associated with steel when placed within pervious concrete.

Embedding the basalt reinforcement matrix members of the instant invention within pervious concrete increases the PSI rating level of the concrete to be sufficient to withstand traffic loads and other weight bearing loads. The basalt reinforcement members both reinforce the pervious concrete material and the basalt reinforcement members can be exposed to untreated water without being weakened. Through the use of pervious concrete combined with the matrix basalt reinforcement members, parking lots and roads can be formed so that the rainwater runoff is reduced yet provide superior reinforcement over steel or non-configured basalt reinforcement members. The rainwater is still allowed to pass through the pervious concrete surface and down below the grade of the concrete surface, yet less concrete is needed to handle higher loading than would be possible with other known methods of reinforcements for reasons as described elsewhere in this document.

Through the use of the present invention, the groundwater aquifers can be more readily replenished because the water/moisture passes through the pervious concrete to reach aquifers that might be located below the concrete. Pervious concrete allows water to seep into the soil thereby recharging groundwater tables and reducing large amounts of storm water runoff.

FIG. 1A is a perspective view of a strand 10 of basalt fiber. Strand 10 includes a first side portion 12 and a second side portion 14. The first and second side portions are connected together at their ends 16 and 18. FIG. 1B is a top view of the basaly fiber 10 in FIG. 1A. FIG. 1C is a side view of the basalt fiber in FIG. 1A. A plurality of strands 10 are woven together, as illustrated in FIG. 1D and the detail A-A. These woven strands 10 give the finished strand support in two dimensions, laterally and longitudinally.

FIG. 2A illustrates a device 20 which is utilized to weave a plurality of basalt fibers 10 together. The arrows 22 indicate the same longitudinal direction of a basalt fiber 10 as it is woven on the machine 20. FIG. 2B is a vertical view of the weaving device 20 illustrated in FIG. 2A.

The strand 10 is then coated with a polymer. The polymer is selected so that when the polymer dries is hardens and holes the basalt fibers i which when dry within a thermoplastic of a thermoset polymer selected from the group of as urethane, polyester, vinyl ester, epoxy, phenolic, polyimide, polyamide, polypropylene, PEEK, methacrylate, or a combination thereof. While the preferred design is with basalt, any material with sufficient tensile strength can be used.

FIG. 3D is a top view of a configuration or element 24. The configuration or element 24 is a result of a strand 10 of basalt fiber which has been placed onto a form in a specific pattern, which will be described herein after. The configuration or element 24 includes an upper layer 26 and a lower layer 28. These upper and lower layers cross each other at specific locations within the configuration. A first set of points at which the upper and lower layers cross each other is illustrated at 30, 32, 34, 36, 38, and 40. A second set of points at which the upper and lower layers cross each other is illustrated at 42, 44, 46, 48, 50, and 52. A third set of points at which the upper and lower layers cross each other is illustrated at 54, 56, 58, 60, 62 and 64. The upper and lower layers also cross each other at point 66. FIG. 3E which is an enlarged portion of FIG. 3D taken within circle C-C, illustrates in greater detail the crossing over pattern of the upper and lower layers of the basalt fiber of a strand 10 of a basalt fiber that is used to form a panel. FIG. 3C illustrated the manner in which a plurality of configurations or elements 24 are secured together to form a panel 68.

FIG. 3A is the top view of a configuration or element 24 similar to FIG. 3D. FIG. 3A illustrates the downward loading on one element 24 of a panel 68 as the result of traffic. In other words, when a panel 68 is used to reinforce concrete that is used to construct a street, the loading on the elements 24 of panel 68 is illustrated by arrows 70 and 72 in FIGS. 3A and 3B respectively. Arrows 70 and 72 indicate the direction in which tension is applied to the elements 24.

Figure 3:
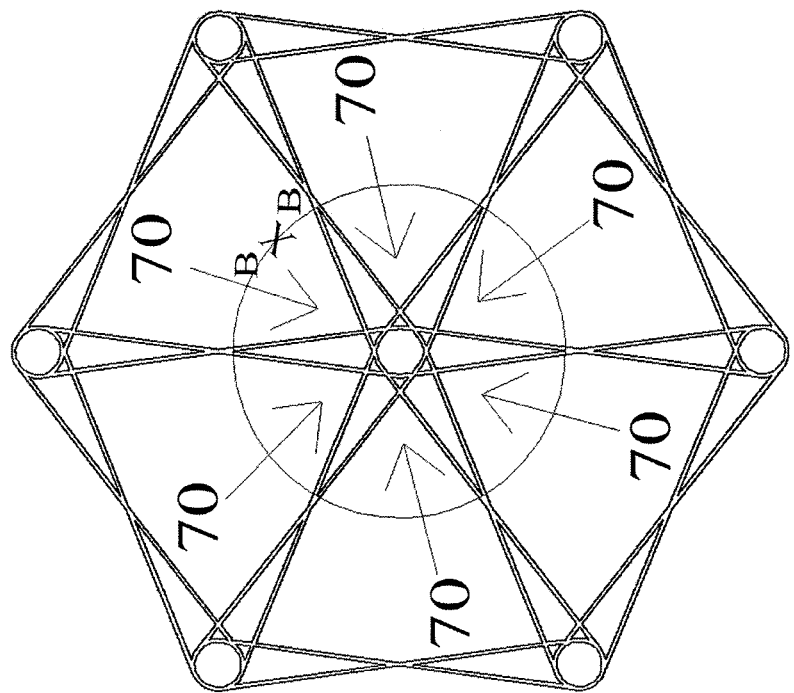
FIG. 3A is a top view of a roving cross basalt fiber configuration.
FIG. 3B is view taken with in circle B-B of FIG. 3A of abutting roving cross basalt fiber configuration.
FIG. 3C is a top view of a sheet of roving cross basalt fiber matrix configuration.
FIG. 3D is FIG. 3A illustrating tension.
FIG. 3E is a view taken within circle C-C in FIG. 3D illustrating tension.
FIG. 3F is a view of the basalt matrix configuration with tire loading.
FIG. 3G is a top view of a panel of the present invention which can be added to the roadway support illustrated in FIG. 3F.
Figure 3:
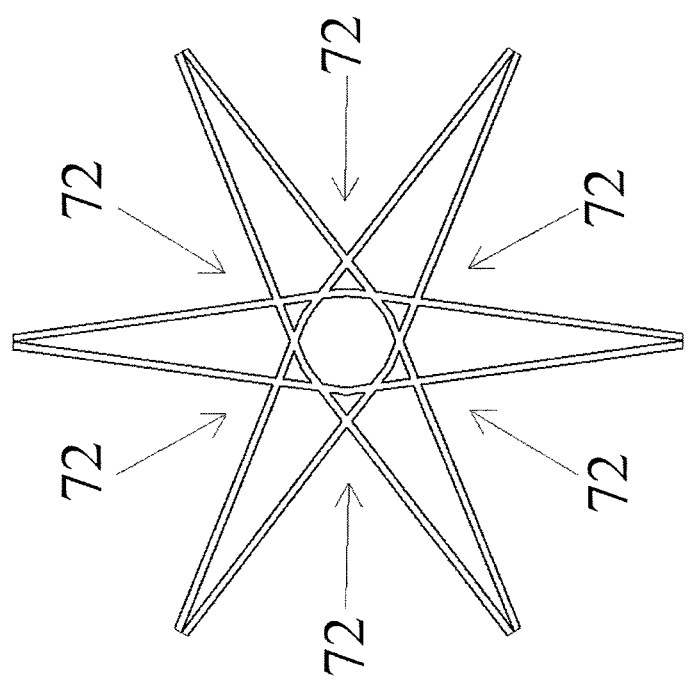
Figure 3F:
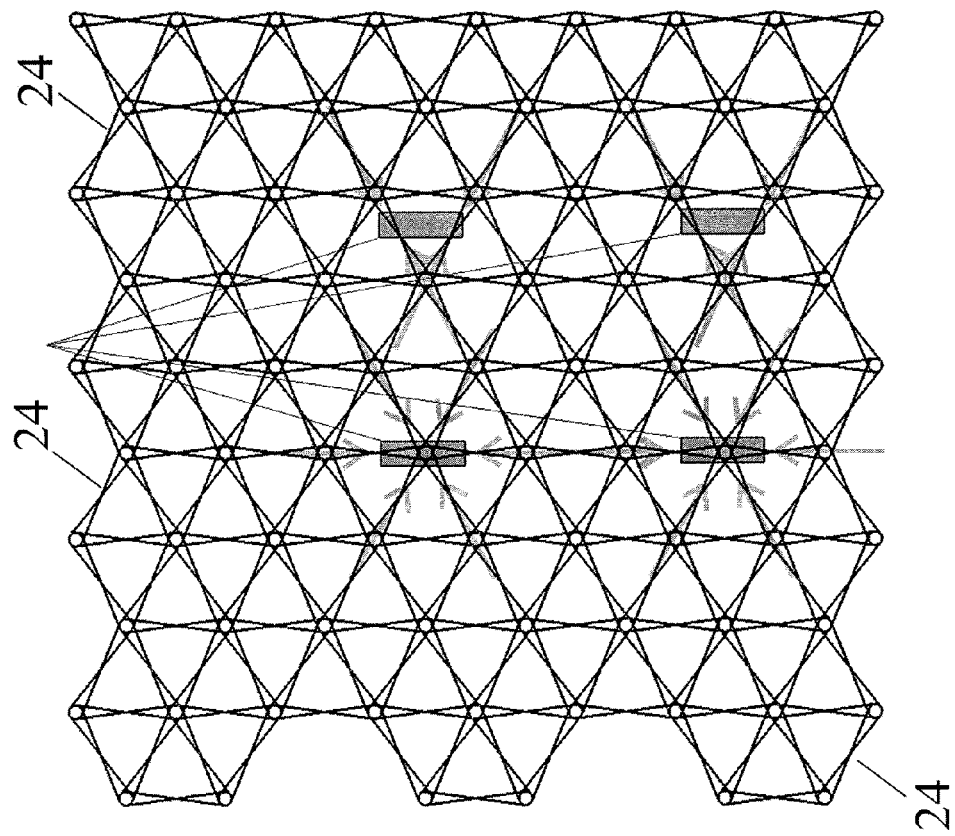
Figure 3G:
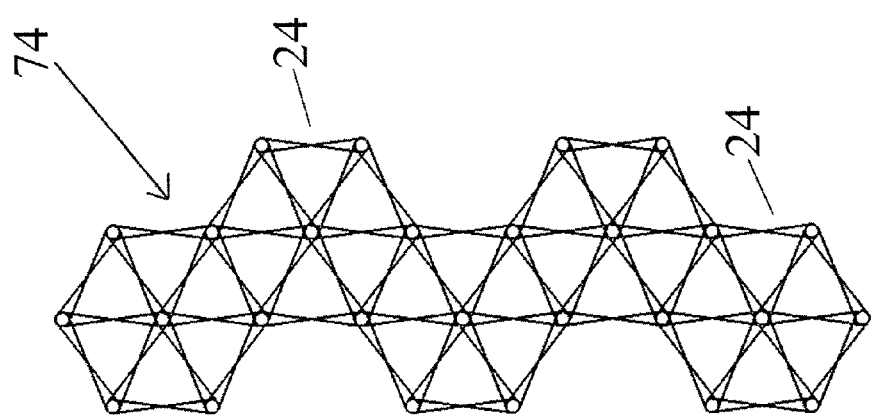

In a preferred embodiment, the central portion of element 24 in FIGS. 3B and 3E has a focus aperture with an inner radius of about 0.750 inches and an angle between branches of about 75.57 degrees. The diameter of the central portion of element 24 is about 12 inches. A module 74 of elements 24 is illustrated in FIG. 3G. The module 74 is 24 inches from outer apertures across the focus aperture. FIG. 3B is a top view of a sheet of modules, the width and length of the sheet can be cut along the branches and apertures. FIG. 3C is FIG. 3A illustrating tension under load directed to the focus aperture along each branch. FIG. 3D is FIG. 3B illustrating tension from the module again toward the focus aperture. The basalt reinforcing members are formed from roving crosses and interlaces in between each side of the figure 8 shape to mitigate potential for sheer at crossovers while maintaining nearly optimum linear alignment of the basalt fibers to achieve an ultimate stretch just slightly beyond the elasticity of the concrete allowing both the concrete and the continuous basalt fiber reinforcement to load up in unison.

Figure 4:
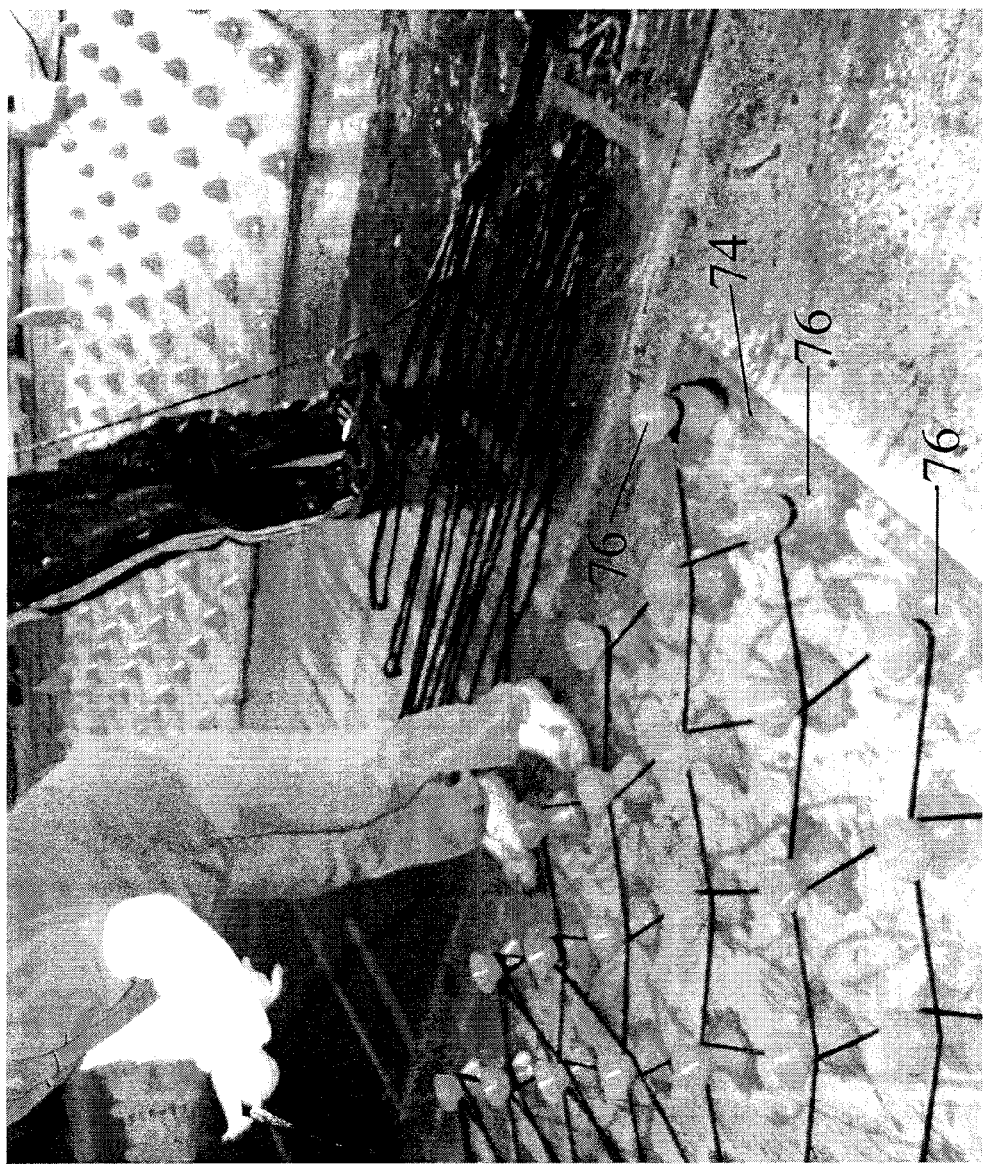
FIG. 4 is a perspective view of the basalt fiber formation matrix and mold configuration.

FIG. 4 illustrates a baseplate 74 which is provided with a plurality of upstanding projections 76. Each of the projections 76 is "hourglass" shaped. In other words the projections have a relatively small diameter at the center thereof and relatively larger diameters at the ends of the projection 76. To make a panel of the present invention, an operator soaks the strand 10 of fibrous material containing basalt in a thermo set polymer. The strand 10 is then wrapped around the plurality of projections 76 in a specific predetermined pattern.

Figure 5:
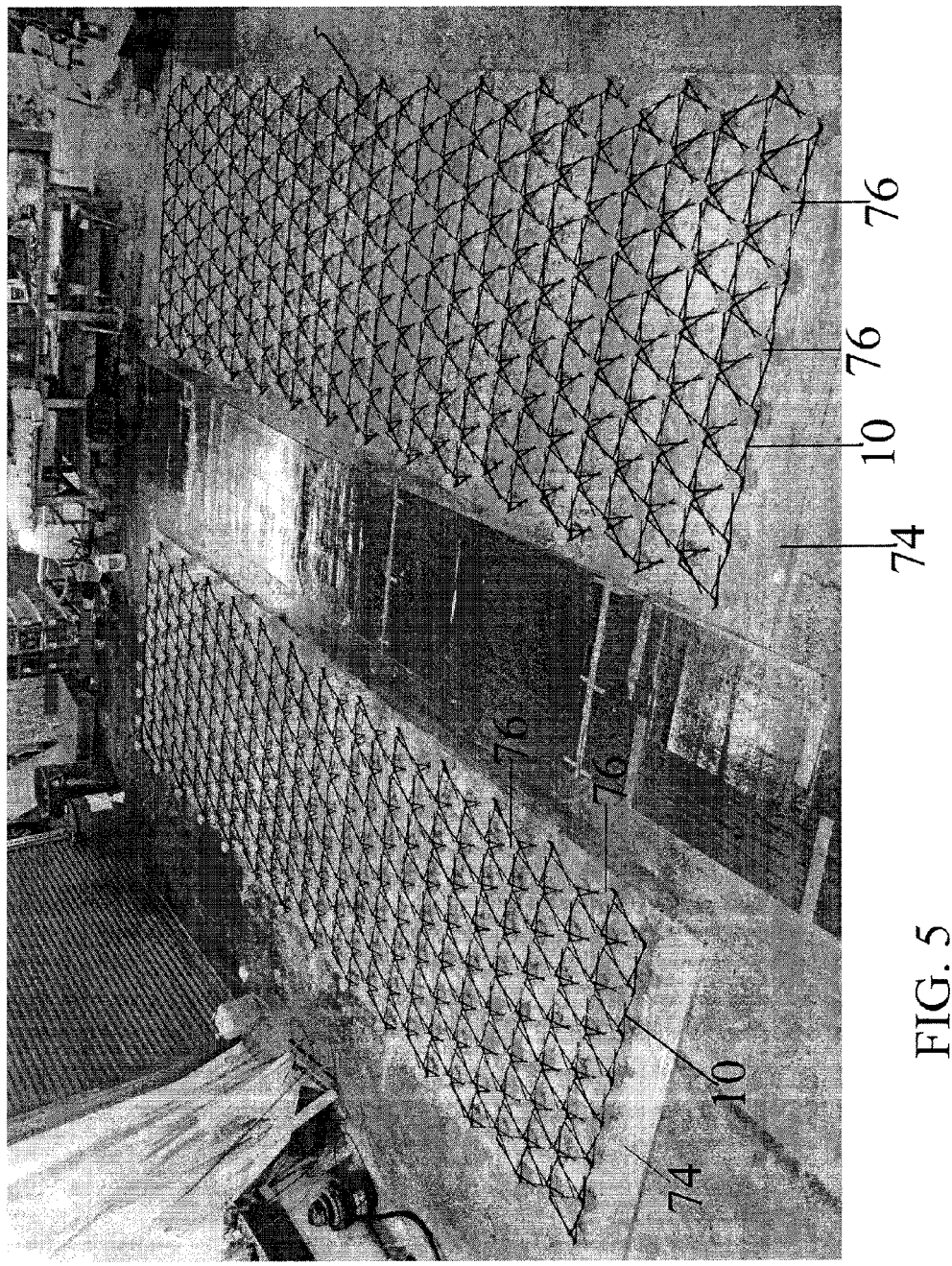
FIG. 5 is a perspective view of basalt fiber molds to form the matrix.

FIG. 5 illustrates a plurality of baseplates 74 positioned on a floor. The strand 10 of the fibrous material has been wrapped onto each baseplate 74.

Figure 6:
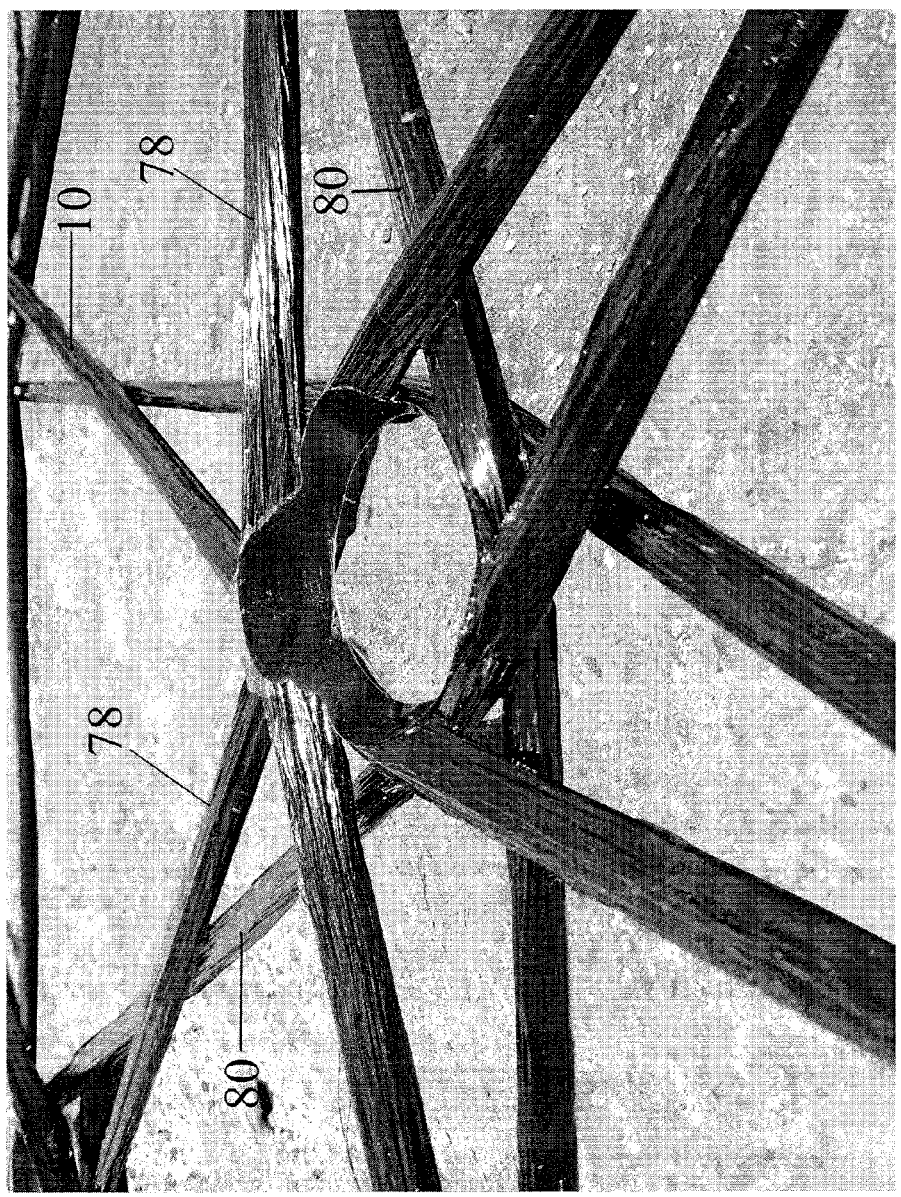
FIG. 6 is a perspective view of a detail of the basalt fiber matrix.

FIG. 6 illustrates the manner in which the strand 10 is wrapped onto the baseplate to have an upper layer 78 and a lower layer 80.

Figure 7:
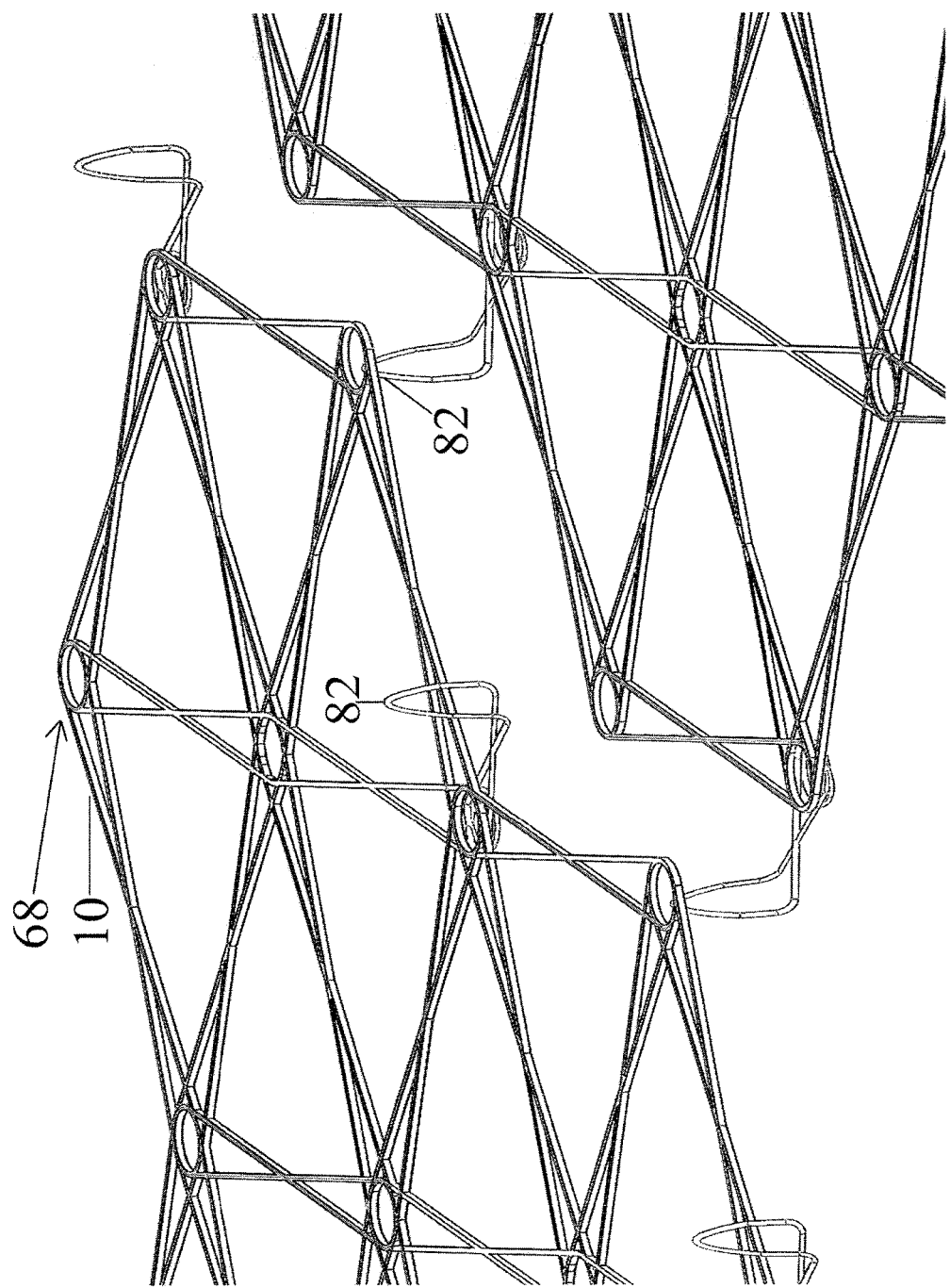
FIG. 7 is a perspective view of basalt fiber matrix including spacers.

FIG. 7 is another embodiment of a panel 68 of the present invention including a strand 10 of basalt fiber wrapped in a predetermined manner. In the embodiment of FIG. 7 a spacer 82 is secured to the panel 68 and extends in a second plane which is not parallel to the plane of panel 68. The spacer 82 can be a portion of the strand 10 or is can be formed as a separate element and added to the panel 68 as the strand 10 is being wrapped onto the baseplate 74.

Figure 8:
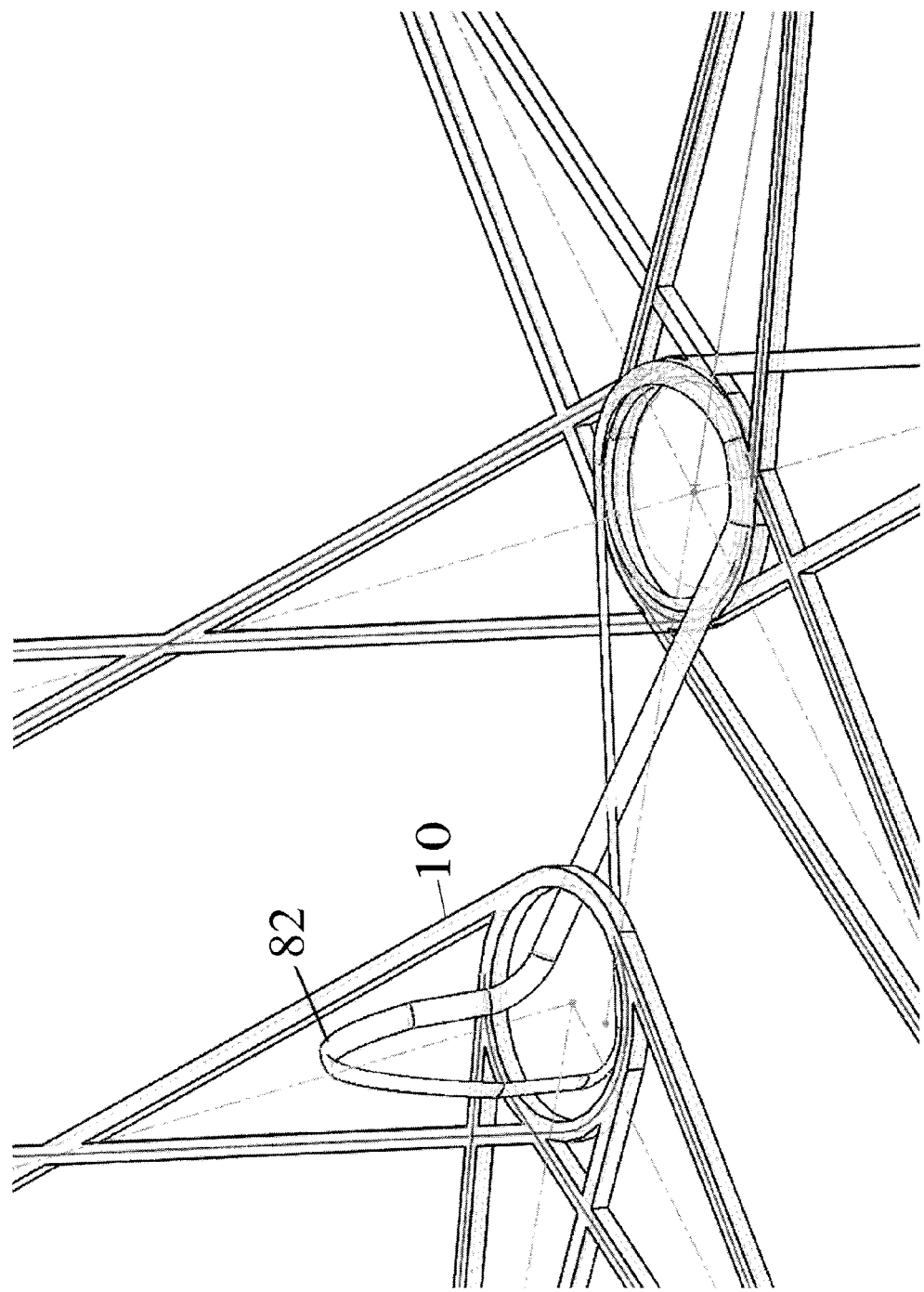
FIG. 8 is a detailed view of the basalt fiber matrix in FIG. 7.

FIG. 8 is an enlarged portion of FIG. 7 illustrating the details of the connection of element 82 to panel 68.

Figure 9:
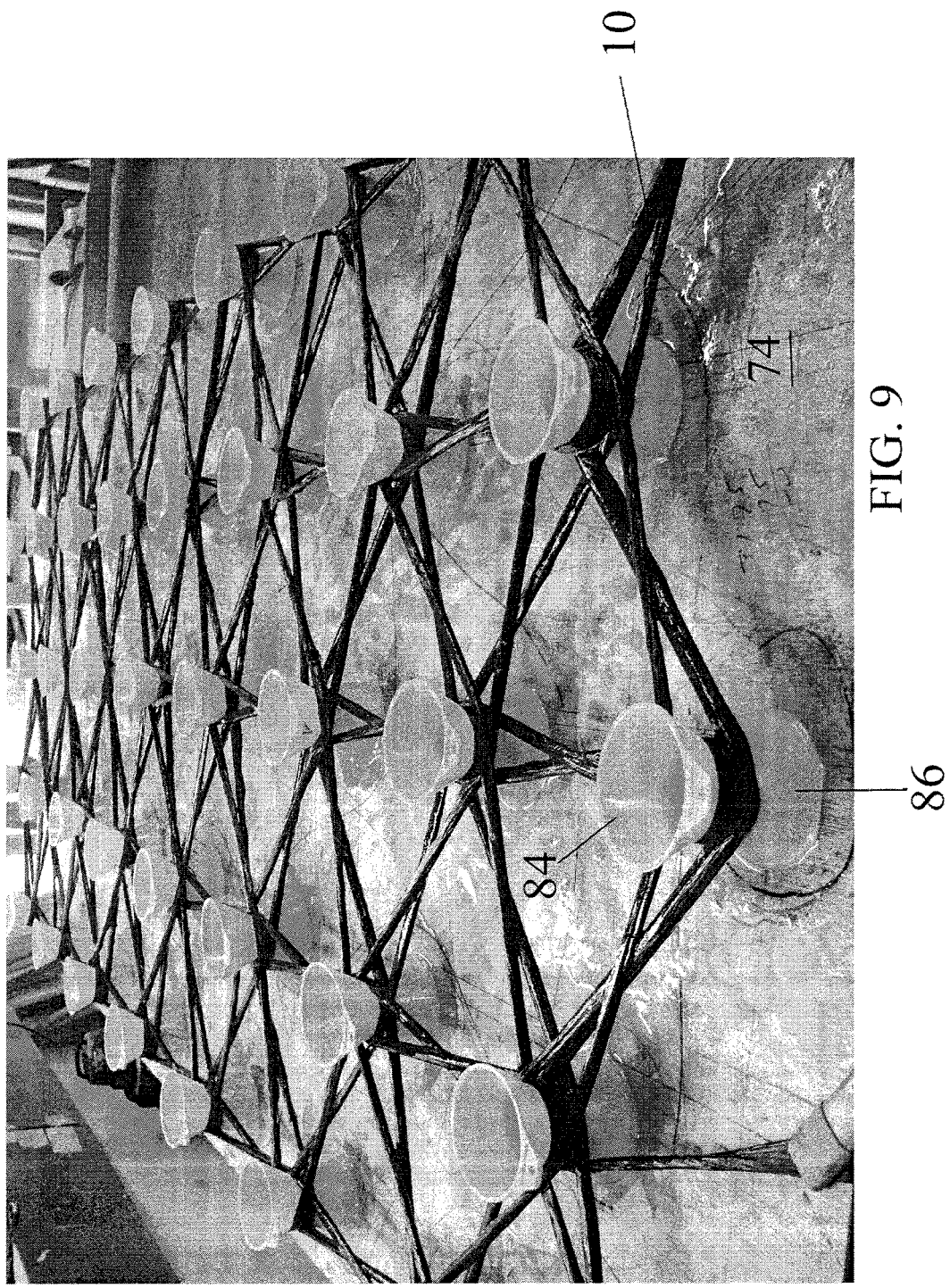
FIG. 9 is a perspective view of basalt fiber being placed onto a matrix mold form.

FIG. 9 illustrated another embodiment of the baseplate 74. In this embodiment the supports 76 are formed from two funnels 84 and 86 which are connected to each other at their narrow portions. The resulting structure has an "hourglass" shape.

Figure 10:
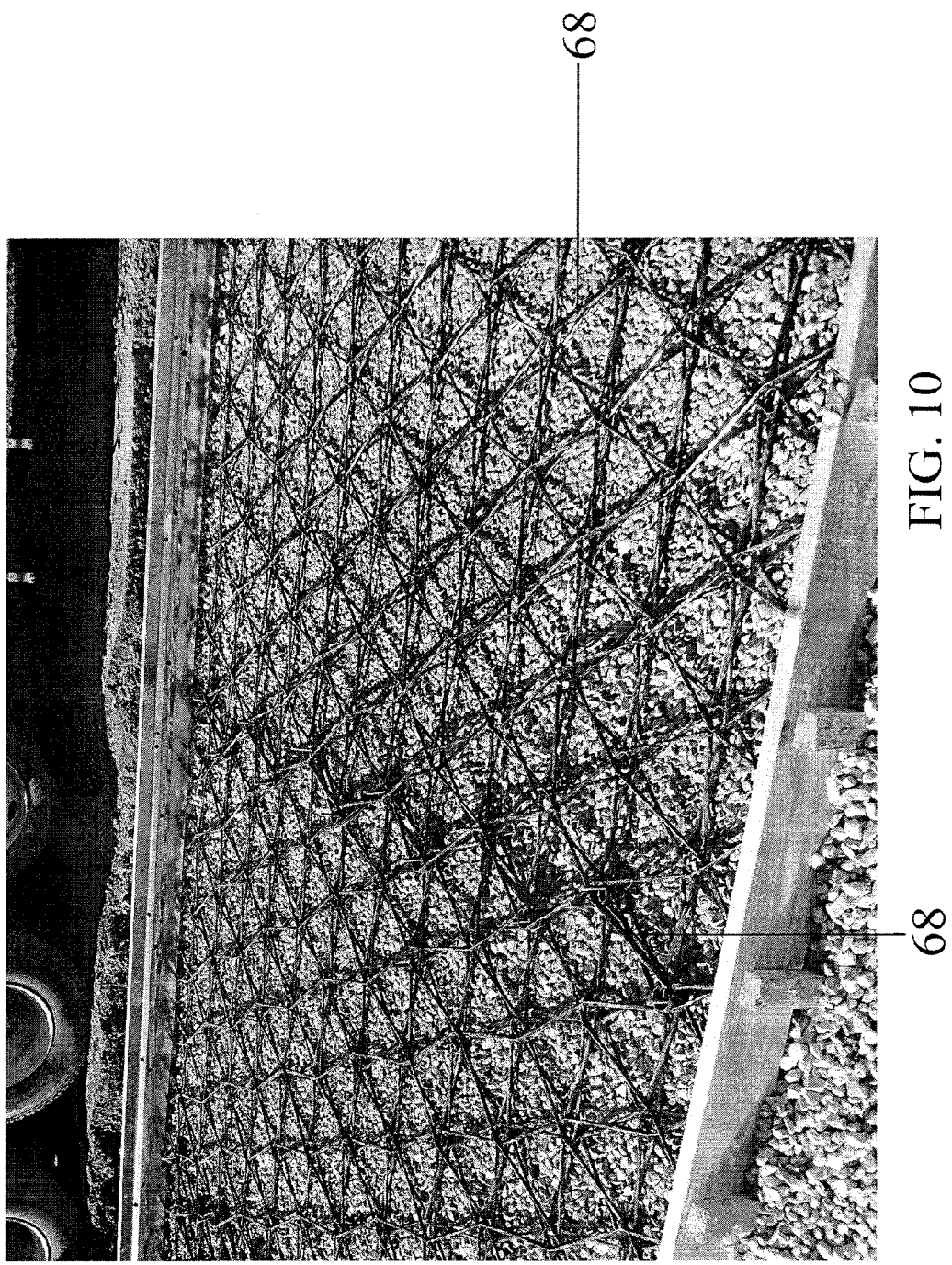
FIG. 10 is a perspective view of a finished basalt fiber matrix panel on the ground.

FIG. 10 illustrates a plurality of panels 68 positioned on the ground.

Figure 11:
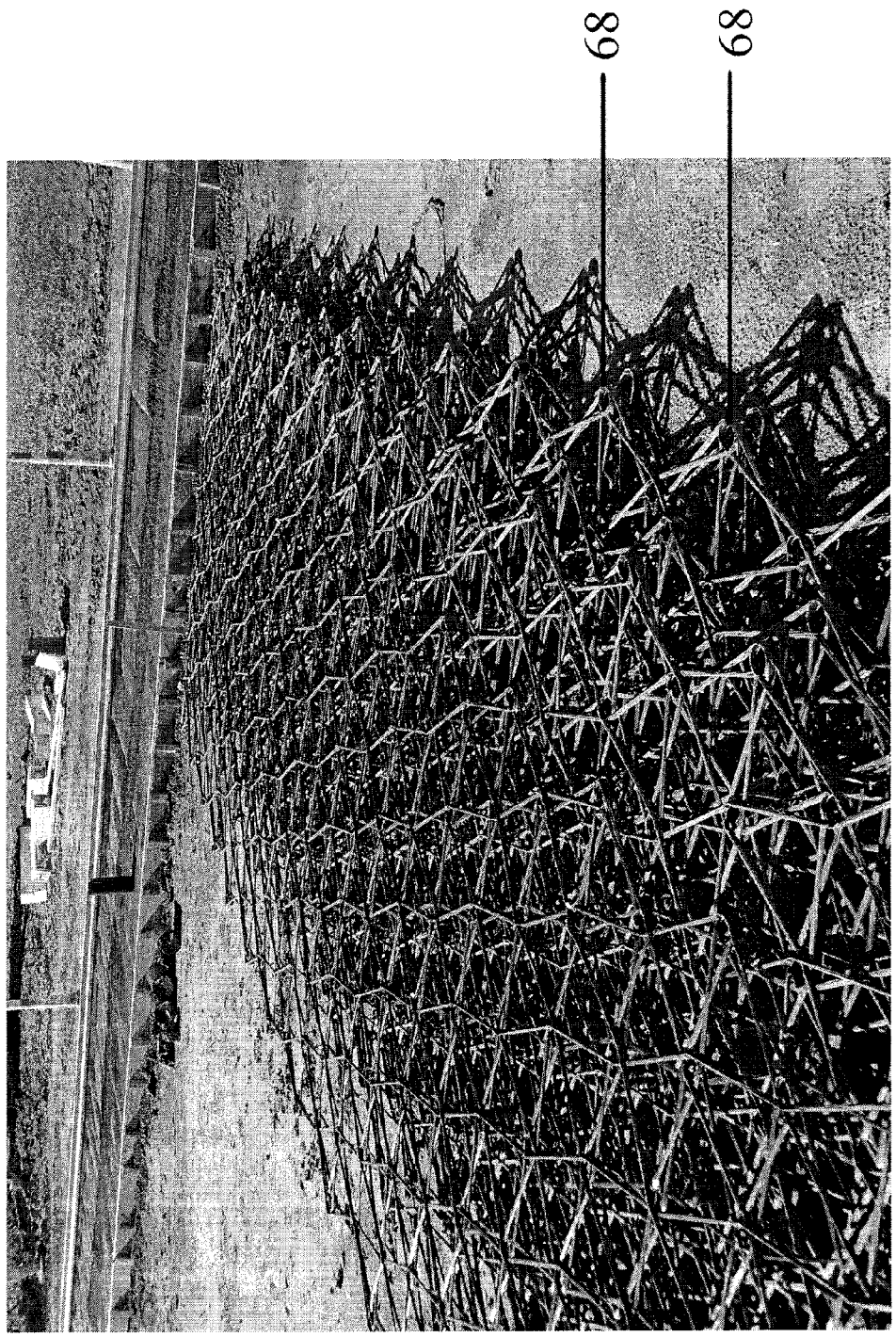
FIG. 11 is perspective view of a plurality of basalt fiber panels vertically stacked.

FIG. 11 is perspective view of a plurality of panels 68 stacked on top of each other and the stacks being placed adjacent to each other.

Figure 12:
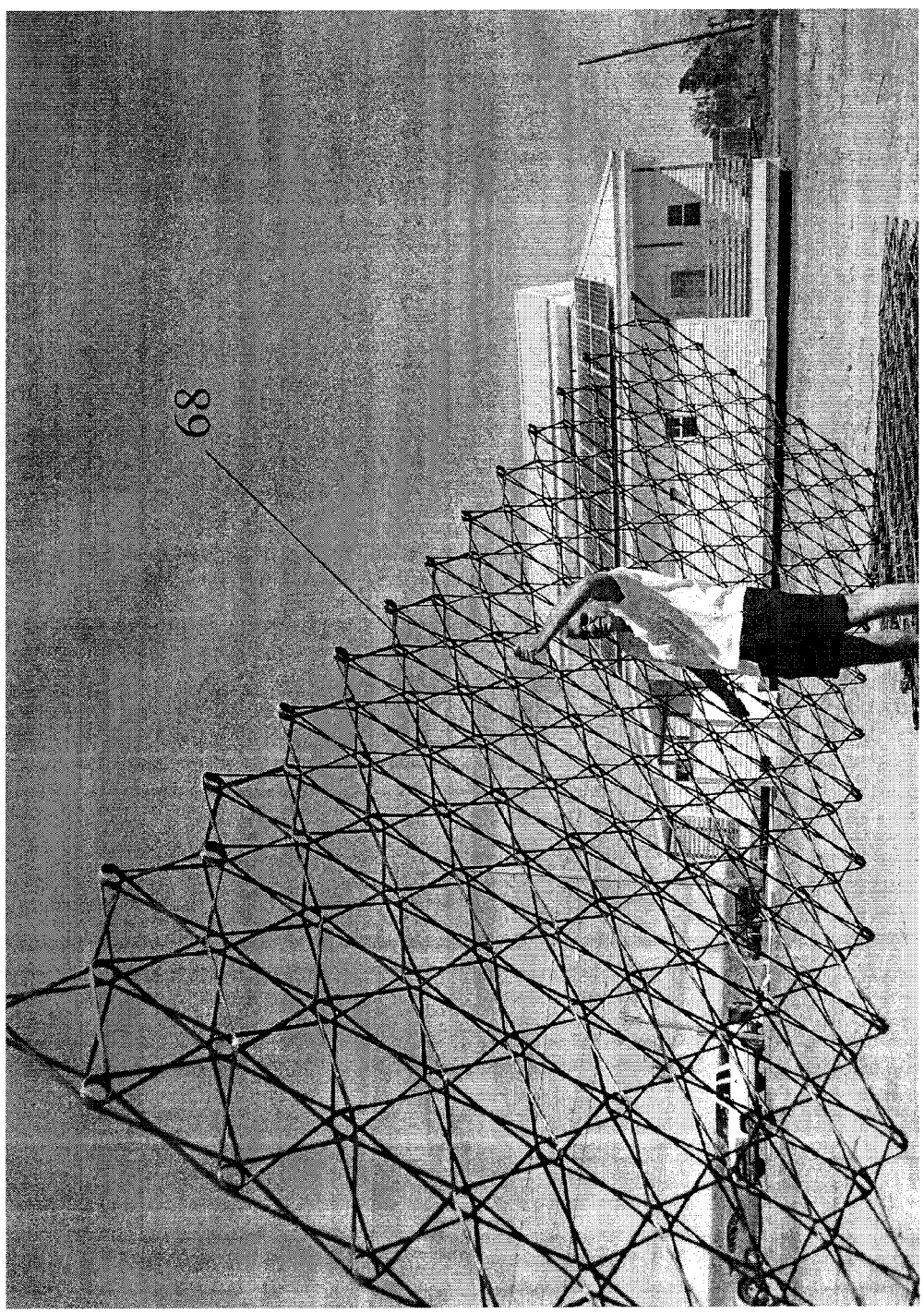
FIG. 12 is a view of a basalt fiber panel being loaded into a vehicle.

FIG. 12 illustrates a panel 68 of basalt fiber matrix material which has been cut into 92"×280" sheets being placed with a vehicle. The weight of each sheet is less than 100 lbs. per sheet.

Figure 13:
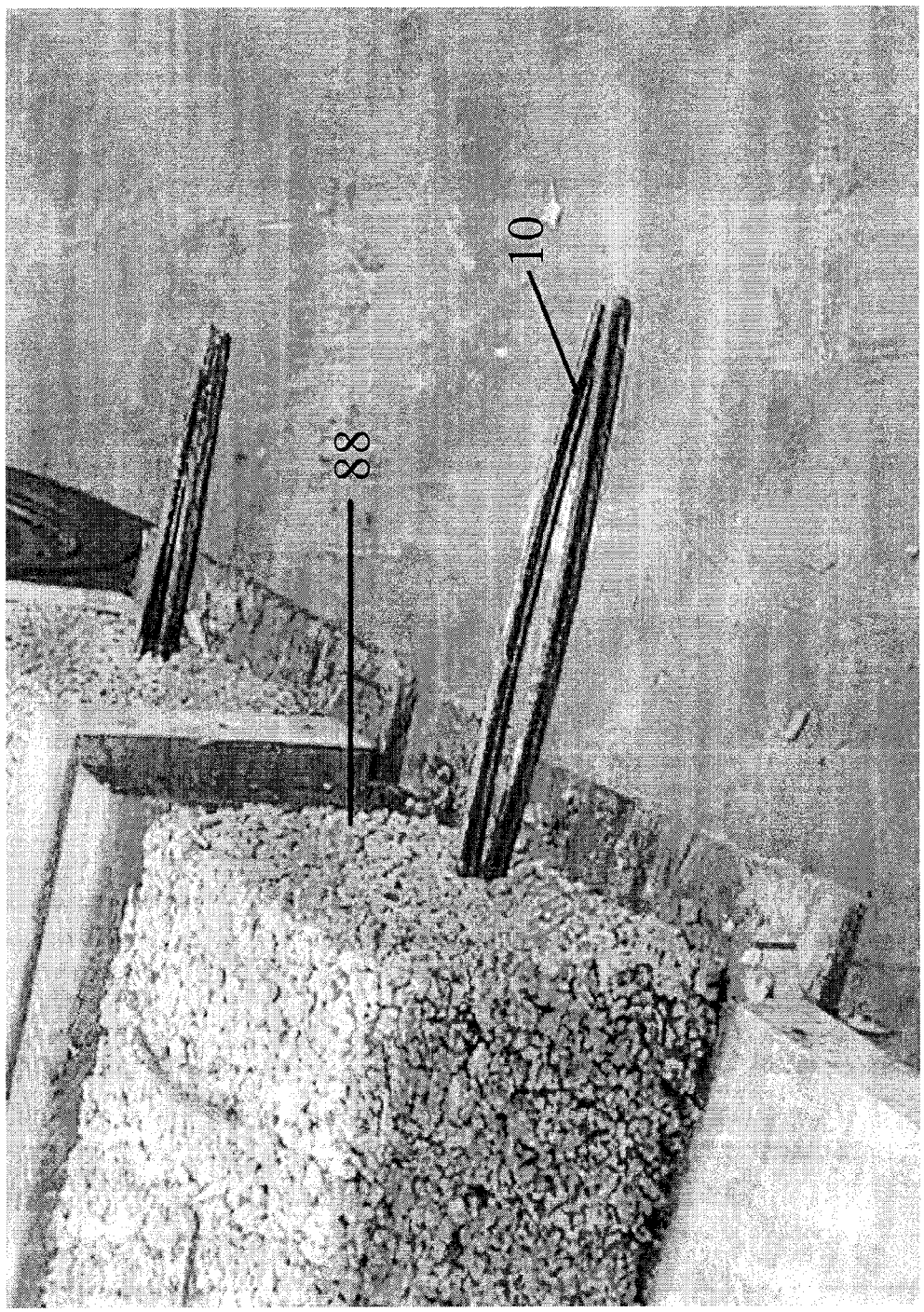
FIG. 13 is a perspective view of basalt fibers embedded into concrete.

FIG. 13 is perspective view of a strand 10 of the present invention embedded in a block of concrete 88.

Figures 14A, 14B:
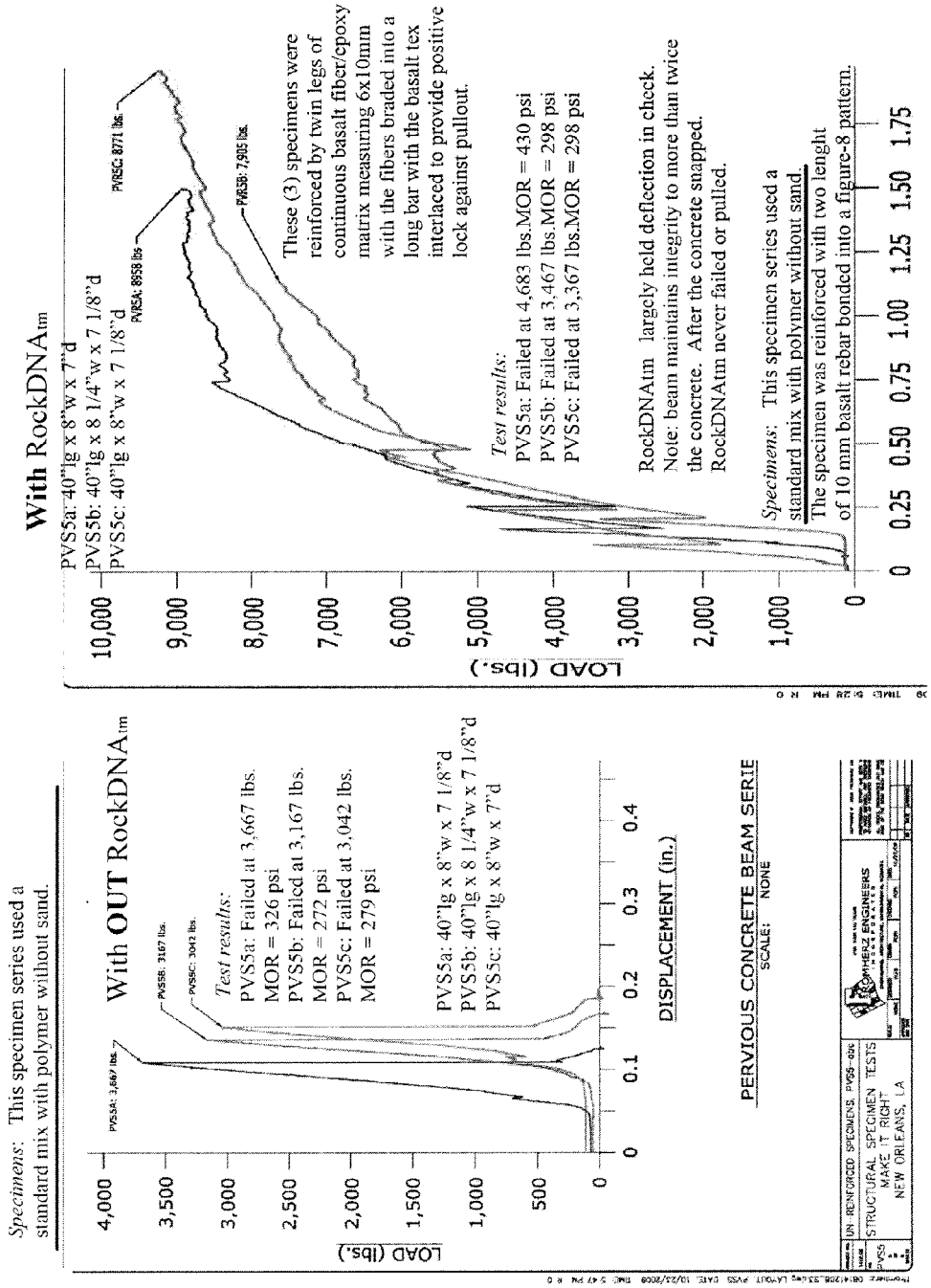
FIG. 14A is a chart indicating pervious concrete beam failures without the present invention.
FIG. 14B is a chart indicating pervious concrete failures with the present invention.
Figure 15:
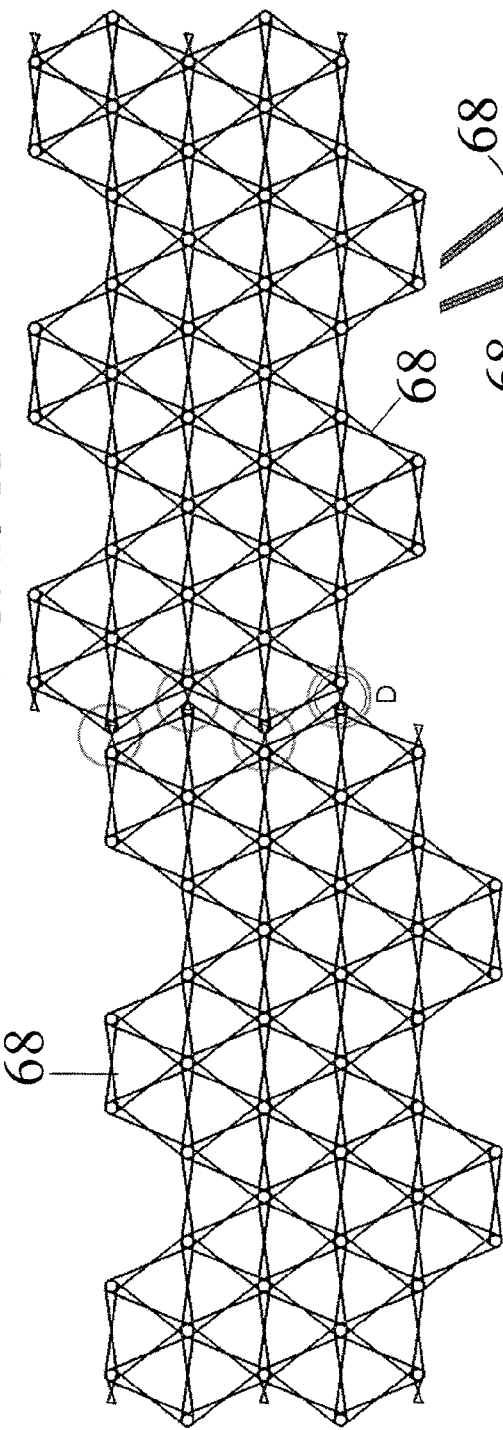
FIG. 15A is an top view of a basalt fiber matrix formation.
FIG. 15B is a detailed illustration of the spacers used for connecting adjoining panels taken within circle D.
FIG. 15C is a detail of basalt fiber used to connect two layers together.
Figure 15:
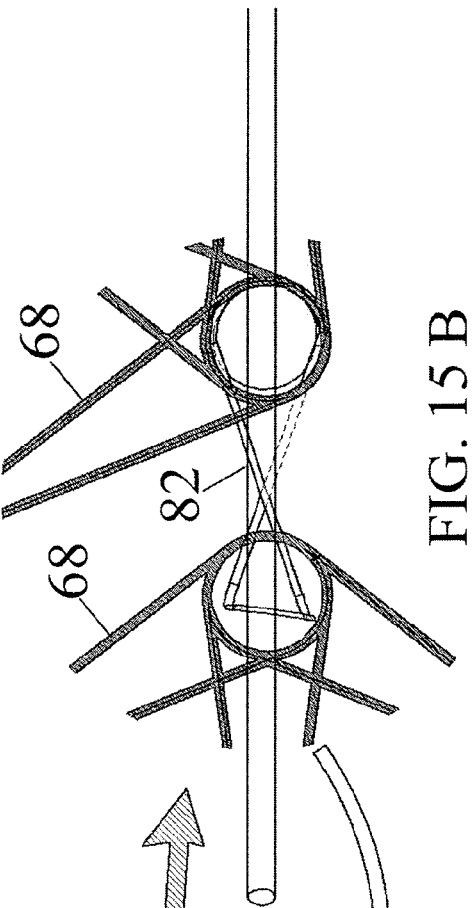
Figure 15:
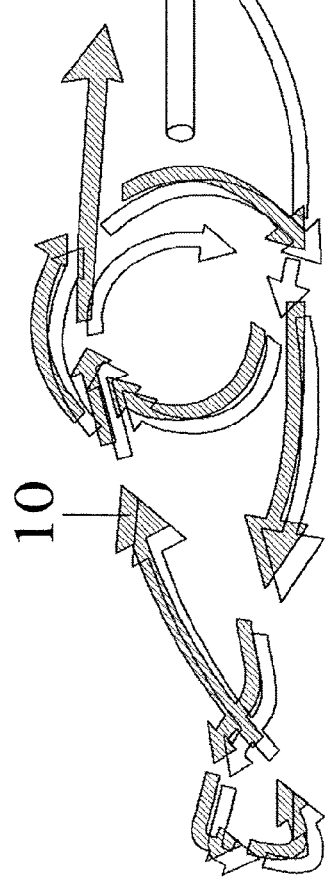

FIG. 14A is a chart indicating pervious concrete beam failures without the present invention, the load on the beam indicates a failure of 3042 lbs., 3167 lbs. and 3667 lbs. FIG. 14B is a chart indicating pervious concrete beam failures that were reinforced by twin legs of continuous basalt fiber/epoxy matrix measuring 6×10 mm with the fibers braided into a long bar with the basalt tex interlaced to provide positive lock against pullout. The failure now improved to 7905 lbs, 8771 lbs, and 8958 lbs. The beams were made from a standard mix with polymer without sand.

FIG. 15A illustrated two panels 68 secured together at their ends. A spacer 82 is used to secure the two panels 68 together.

FIG. 15B illustrates the detail within circle D in FIG. 15A. In FIG. 15B it is clearly illustrated the manner in which the spacer 82 secures the two panels 68 together.

FIG. 15C illustrates the manner in which the strand 10 is wrapped so as to from an upper layer and a lower layer.

FIG. 16A illustrates the manner in which the spacer 82 is secured to an adjacent panel 68. A first end 90 of the spacer 82 extends upwardly through a portion of the matrix of panel 68 to maintain spacing between multiple panels 68. A second end 92 of the spacer is secured to the panel 68.

FIG. 16 B illustrates the manner in which the spacer 82 is secured to a panel and the first end 90 extends downwardly to serve as a spacer to maintain the panel a predetermined distance above the ground. A second end 92 is secured to the panel 68.

FIG. 16C illustrates the manner in which the strand 10 is wrapped so as to from an upper layer and a lower layer.

In light of the above and according to one aspect of the invention, disclosed herein is a basalt reinforcement bar matrix to form improved concrete structures that can be used to make roads, sidewalks and other pavements or infrastructures. Specifically, the present invention utilizes pervious concrete material with matrix basalt reinforcement members that address the unique properties of concrete, namely while a mix may be sufficiently high in compression strength most likely it will be inherently quite low in tensile strength. Most likely low in ultimate bond potential with any conventional reinforcement and open to subjecting any reinforcement introduce to high level of moisture intrusion which ultimately will introduce elevated levels of acids salts and alkalinity in addition to hydrocarbons present in water runoff. While pervious concrete is a preferred embodiment, other types of concrete and masonry products can also be employed with the present invention.

The extremely low stretch and cyclical tenacity of continuous basalt fiber is exploited to produce a reinforcing member specifically formed to provide tension support for pervious concrete. The reinforcing members produced using continuous basalt fibers (CBF) in an appropriate adhesive matrix be it a thermo plastic or a thermo set epoxy, vinyl ester or urethane add structural rigidity to the pervious concrete, making the pervious concrete capable of supporting heavy loads such as trucks without cracking while allowing water to pass through the concrete. The CBF reinforcing members are formed from multiple roving (bundles) to produce the required strength for the load predictions in a similar manner to steel calculations. The micron size of the basalt fiber and the size of the CBF roving may be altered as necessary. To prevent slippage of the reinforcement within the concrete the roving's are spaced sufficiently to allow the concrete to flow between the legs and crossed and interlaces in between each side of a figure 8 shape to mitigate potential for sheer at crossovers as in the case of the single figure 8 rebar. Or as in the case of the grid, the geometry contains so many legs surrounding the central intersection pins as to bond and bind into a monolithic hub that dissipates panel tension or compression laterally thus inherently reducing pressure concentration that could otherwise deflect the concrete street, wall or panel sufficiently to cause sheer of the continuous basalt fiber reinforcement at the overlap and or crossovers. In any case the manufacturing process of the reinforcement is continuous without cold secondary bonds of the continuous basalt fiber with the adhesive matrix.

The basalt reinforcing members are basalt rebar rods made of continuous basalt fiber strands combined with non-corrosive thermo set or thermo plastic polymer formed into a matrix shape that, when placed within pervious concrete, adds structural rigidity to the concrete wherein the concrete is capable of supporting loads as normally experienced on pavements. One benefit of using continuous basalt fiber is that in the event of a onetime catastrophic overload cracks the cementious material continuous basalt fiber reinforcement does not exhibit memory for the event and continuous basalt fiber reinforced concrete construction tends to return to their original condition and shape. As an example in the case of a street formed utilizing pervious concrete, the street can be inadvertently crushed by a heavy fire truck. There is a high probability the street would pop back and the void between the depressed underlayment and the underside of the pervious refilled by washing in fine sand.

Continuous basalt fiber is manufactured from basalt filaments made by melting crushed volcanic rock of a specific mineral mixture known as a breed and drawing the molten material into fibers. The fibers cool to form hexagonal chains resulting in a resilient structure having a substantially higher tensile strength than steel of the same diameter at one fifth the weight and virtually corrosion free.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of manufacturing a concrete reinforcing material comprising the steps of:
   coating at least one single strand of a fibrous material containing basalt with a thermosetting polymer which hardens when dried;
   forming said at least one coated single strand into a matrix;
   crossing a first portion of said single strand across a second portion of said single strand;
   providing a plurality of upstanding hourglass shaped projections on a baseplate;

placing said single strand around said plurality of upstanding hourglass shaped projections in a predetermined pattern and repeating said crossing of a portion of said single strand across another portion of said single strand to form a panel;

allowing said matrix containing said at least one coated single strand to solidify and removing an upper portion of said upstanding projections after said single strand has solidified;

whereby said concrete reinforcing member is formed.

2. The method of manufacturing a concrete reinforcing material of claim 1 including forming said at least one strand of a fibrous material containing basalt into an elongate bar; and interconnecting a plurality of said elongate bars into said matrix.

3. The method of manufacturing a concrete reinforcing material of claim 1 wherein said thermosetting polymer is selected from the group consisting of urethane, polyester, vinyl ester, epoxy, phenolic, polyimide, polyamide, polypropylene, PEEK, methacrylate and a combination thereof.

4. The method of manufacturing a concrete reinforcing material of claim 1 wherein said panel extends in a single plane.

5. The method of manufacturing a concrete reinforcing material of claim 1 wherein said panel extends in at least two planes; and a first plane intersects a second plane.

6. The method of manufacturing a concrete reinforcing material of claim 1 wherein said panel extends in at least two planes; and a first plane intersects a second plane.

7. The method of manufacturing a concrete reinforcing material of claim 1 including interconnecting a plurality of panels together.

8. The method of manufacturing a concrete reinforcing material of claim 1 including providing a plurality of spacers;

interconnecting said plurality of spacers to said plurality of panels; and interconnecting said plurality of panels together by said spacers.

9. The method of manufacturing a concrete reinforcing material of claim 1 including placing said single strand around said upstanding projections so as to form panel, said panel having an upper layer and a lower layer; and crossing said single strand above and below itself as said single strand is placed onto said upstanding projections and thereby form said upper layer and said lower layer.

10. The method of manufacturing a concrete reinforcing material of claim 9 wherein said panel extends in at least two planes; and a first plane intersects a second plane.

11. The method of manufacturing a concrete reinforcing material of claim 9 including interconnecting a plurality of panels together.

12. The method of manufacturing a concrete reinforcing material of claim 9 including providing a plurality of spacers;

interconnecting said plurality of spacers to said plurality of panels; and interconnecting said plurality of panels together by said spacers.

* * * * *